US007783308B2

(12) United States Patent
Ögren

(10) Patent No.: US 7,783,308 B2
(45) Date of Patent: Aug. 24, 2010

(54) METHOD OF AND APPARATUS FOR ZONE DEPENDENT CONTENT IN A MOBILE DEVICE

(75) Inventor: Per Ögren, Malmo (SE)

(73) Assignee: Sony Ericsson Mobile Communications AB, Lund (SE)

(*) Notice: Subject to any disclaimer, the term of this patent is extended or adjusted under 35 U.S.C. 154(b) by 61 days.

(21) Appl. No.: 10/885,365

(22) Filed: Jul. 6, 2004

(65) Prior Publication Data

US 2006/0009239 A1 Jan. 12, 2006

(51) Int. Cl.
*H04Q 7/20* (2006.01)
(52) U.S. Cl. .............. 455/456.6; 455/456.2; 455/456.3; 455/456.1
(58) Field of Classification Search .................. 455/456, 455/575.1, 445, 519, 414.1, 41.2, 344, 456.1–457; 342/457, 450; 340/686, 825; 725/31
See application file for complete search history.

(56) References Cited

U.S. PATENT DOCUMENTS

| 6,424,845 | B1* | 7/2002 | Emmoft et al. .......... 455/575.1 |
| 6,563,430 | B1* | 5/2003 | Kemink et al. ......... 340/825.49 |
| 6,577,274 | B1* | 6/2003 | Bajikar ...................... 342/450 |
| 6,625,457 | B1* | 9/2003 | Raith ....................... 455/456.1 |
| 7,474,896 | B2* | 1/2009 | Mohi et al. .............. 455/456.1 |
| 2001/0055974 | A1* | 12/2001 | Bates et al. ................. 455/456 |
| 2002/0132616 | A1 | 9/2002 | Lorna et al. |
| 2002/0137524 | A1 | 9/2002 | Steven et al. |
| 2003/0073448 | A1 | 4/2003 | Satoshi et al. |
| 2003/0112182 | A1* | 6/2003 | Bajikar ...................... 342/457 |
| 2003/0184474 | A1* | 10/2003 | Bajikar ...................... 342/450 |
| 2004/0044655 | A1* | 3/2004 | Cotner et al. ................. 707/3 |
| 2004/0060060 | A1* | 3/2004 | Carr ............................ 725/31 |

(Continued)

FOREIGN PATENT DOCUMENTS

GB 2 368 498 5/2002

(Continued)

OTHER PUBLICATIONS

International Search Report for International Application No. PCT/EP2005/006632 dated Nov. 10, 2005.

*Primary Examiner*—Charles N Appiah
*Assistant Examiner*—Michael T Vu
(74) *Attorney, Agent, or Firm*—Renner, Otto, Boisselle & Sklar, LLP

(57) ABSTRACT

A mobile device comprises a geographic sensor for determining an approximate location of the mobile device, a memory for storing information, and a microprocessor for controlling the device and adapted for receiving data from the geographic sensor and determining whether the mobile device is located in a particular zone. In another embodiment, the mobile device comprises a device sensor for sensing at least one additional mobile device within a predefined area, a memory for storing information, and a microprocessor for controlling the device and adapted for receiving data from the device sensor and determining whether predetermined conditions, regarding additional mobile devices within a predefined area, are met. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims. 37 CFR 1.72(b).

23 Claims, 4 Drawing Sheets

U.S. PATENT DOCUMENTS

| | | | |
|---|---|---|---|
| 2004/0185890 A1* | 9/2004 | Drozt et al. | 455/519 |
| 2004/0192269 A1* | 9/2004 | Hill | 455/414.1 |
| 2004/0198386 A1* | 10/2004 | Dupray | 455/456.1 |
| 2005/0020316 A1* | 1/2005 | Mahini | 455/566 |
| 2005/0046580 A1* | 3/2005 | Miranda-Knapp et al. | 340/686.1 |
| 2005/0090235 A1* | 4/2005 | Vermola et al. | 455/414.3 |
| 2005/0130677 A1* | 6/2005 | Meunier et al. | 455/456.6 |
| 2005/0164633 A1* | 7/2005 | Linjama et al. | 455/41.2 |
| 2005/0272444 A1* | 12/2005 | Heffield et al. | 455/456.2 |

FOREIGN PATENT DOCUMENTS

| | | |
|---|---|---|
| WO | 00/62574 | 10/2000 |
| WO | 01/50781 | 7/2001 |
| WO | 2004/004246 | 1/2004 |

\* cited by examiner

METHOD OF AND APPARATUS FOR ZONE DEPENDENT CONTENT IN A MOBILE DEVICE

BACKGROUND OF THE INVENTION

1. Technical Field

The present invention relates to organization and security of data, and more particularly, but not by way of limitation, to organization and security of data of a mobile device based on geographic zones and/or personnel secure zones.

2. History of the Related Art

Mobile devices are currently growing into devices that may handle many types of media. For example, most mobile devices (e.g., mobile telephones, PDAs, laptops, etc.) today are capable of capturing and storing still images or video clips, storing contact information for numerous people, recording voice memos or written memos, etc. With vast quantities of information available for storage by a mobile device, it may become difficult to quickly navigate through menus and listings to find information requested by a user. Currently, mobile devices may store information, such as contacts, according to the individual. For example, a mobile device may have a listing of names and, associated with each name, a home telephone number, a mobile telephone number, email address, etc.

As users of mobile devices are now storing large amounts of information, some of which may be work sensitive or personal in nature, mobile device manufacturers are also looking to ways of securing the stored information to prevent information from being accessed or transmitted to others without the user's permission. Today's technology allows mobile device users to lock the mobile device to prevent others from viewing information stored therein. However, when the mobile device is locked, according to the current state of the art, none of the information may be accessed on the mobile device and no outgoing calls may be made.

In addition, mobile devices may also include Global Positioning System (GPS) for locating the position of the mobile device. Currently, GPS positioning may be utilized by emergency personnel to locate a mobile device when, for example, a 911 call is made from the mobile device. GPS positioning may also be utilized to track the location of the mobile device and/or generate directional instructions to a user of the mobile device.

BRIEF SUMMARY OF THE INVENTION

The present invention relates generally to mobile devices capable of securing and/or organizing information based on geographic zones and/or personnel secure zones. In one embodiment, the mobile device comprises a geographic sensor for determining an approximate location of the mobile device, a memory for storing information, and a microprocessor for controlling the device and being adapted for receiving data from the geographic sensor and determining whether the mobile device is located in a particular one of the at least one geographic zone.

In another embodiment, the mobile device comprises a device sensor for sensing at least one additional mobile device within a predefined area, a memory for storing information, and a microprocessor for controlling the device and being adapted for receiving data from the device sensor and determining whether predetermined conditions, regarding additional mobile devices within a predefined area, are met.

In yet another embodiment, the present invention relates to a method for utilizing personnel groups in the operation of a mobile device. The method comprises the steps of sensing, by a device sensor, at least one additional mobile device within a predefined area, storing information in a memory, and determining whether predetermined conditions, regarding additional mobile devices within a predefined area, are met.

In another embodiment, the present invention relates to a method of utilizing zones with a mobile device. The method comprises the steps of determining, by a geographic sensor, an approximate location of the mobile device, storing information in a memory, and determining whether the mobile device is located in a particular secure zone based on data received from the geographic sensor.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

Embodiments of the present invention relate to information sorting and data security based on geographic location and/or personnel. For example, information may be sorted according to geographic location so that when a mobile device is in a specific location, specific data is available for viewing, transmission, etc. Embodiments of the present invention also relate to security features based on secure zones that may be organized by geographic location and/or personnel groups. The geographic secure zones allow specific data to be accessed when the mobile device is in a specific location and the personnel secure zones allow specific data to be accessed when a specific set or subset of personnel are gathered together. The personnel secure zones may be defined by a set of mobile devices of the personnel being within a geographic secure zone as sensed by the mobile device. In another option, the personnel secure zones may be defined by sensing the other mobile devices in an area by e.g., infrared or BLUETOOTH. The personnel secure zones may also be linked to a specific geographic location and/or time period.

Figure 1:
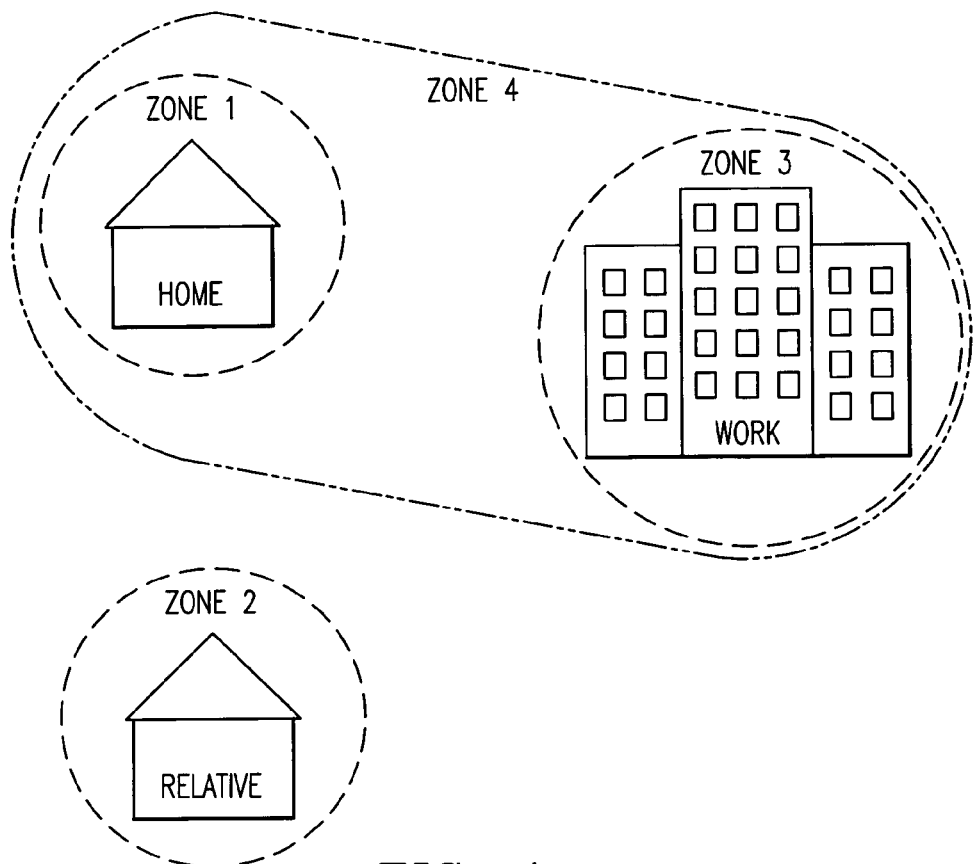
FIG. 1 is a diagram illustrating geographic secure zones in accordance with an embodiment of the present invention.

Referring now to FIG. 1, a geographic secure zone in accordance with an embodiment of the present invention is illustrated. A variety of zones may be present in one or more geographic locations. For example, a home zone (zone 1), a relative zone (zone 2), and a work zone (zone 3) may be, for example, within one city or in a geographically dispersed arrangement (e.g., one or more zones located in different cities and/or countries). In addition, zones may be created that overlap other zones and/or may incorporate one or more geographic features, such as a user's home and work. For example, zone 4 includes both zone 1 and zone 3. In some embodiments, zones 1 and 3 may be eliminated and only zone 4 may exist. It will be understood by one skilled in the art that more or fewer zones in a wide variety of orientations is possible in accordance with principles of the present invention.

Figure 2:
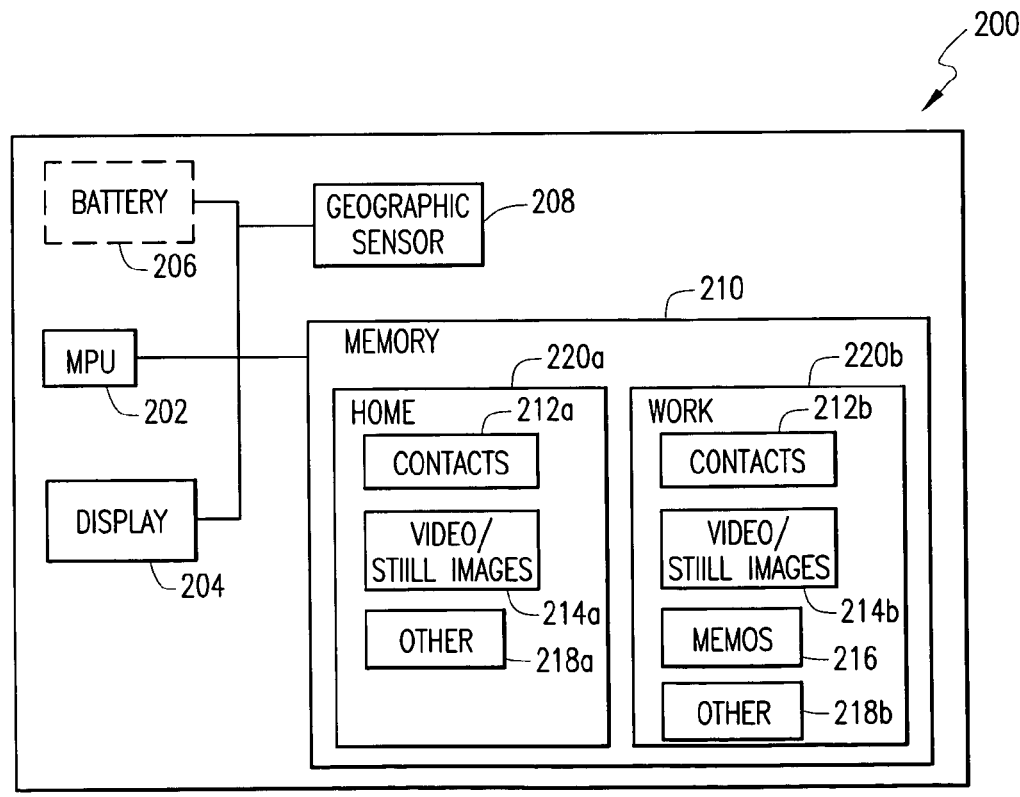
FIG. 2 is a block diagram of a mobile device in accordance with an embodiment of the present invention.

Referring now to FIG. 2, a mobile device 200 in accordance with an embodiment of the present invention is illustrated. The mobile device 200 includes a microprocessor (MPU) 202 for controlling operation of the mobile device 200, a display 204 for displaying information to a user, and an optional battery 206. For geographic secure zones, as noted above with FIG. 1, the mobile device 200 includes a geographic sensor 208, such as, for example, a GPS sensor. For other embodiments, such as those for personnel secure zones, the geographic sensor 208 may not be necessary. The mobile device 200 also includes a memory 210 for storing a plurality of data items. For example, the memory 210 may hold data items related to contacts 212a, 212b, video/still images 214a, 214b, memo data items 216, and other data items 218a, 218b. The data items may be divided into a home category 220a and a work category 220b; however, other arrangements are possible. For example, the data items may be separate without the need for home and work categories 220a, 220b. In another option, the contacts 212a, 212b may be joined into one contacts item without a delineation as to work contacts and home contacts.

Referring now to FIGS. 1 and 2 in combination, the data items may each be associated with a particular zone or zones, or each category (e.g., home or work categories 220a, 220b) may be associated with a particular zone or zones. For example, data items in the home category 220a may only be accessible within zone 1, zone 4, zones 1 and 2, within zones 2 and 4, etc. Similarly, data items of the work category 220b may be accessible within zone 3, zone 4, etc. In another option, specific data items may be accessed within specific zones regardless of in which category 220a or 220b the data item resides. For example, the work contacts 212b may be accessible in all zones or zone 4 due to the fact that many users may desire to work from home. However, work sensitive memos, or all data within the memo data items 216, that require a higher security may be accessible only in zone 3 or only zone 4 in order to prevent viewing or transmission of sensitive work materials to persons other than the user of the mobile device 200.

Figure 3:
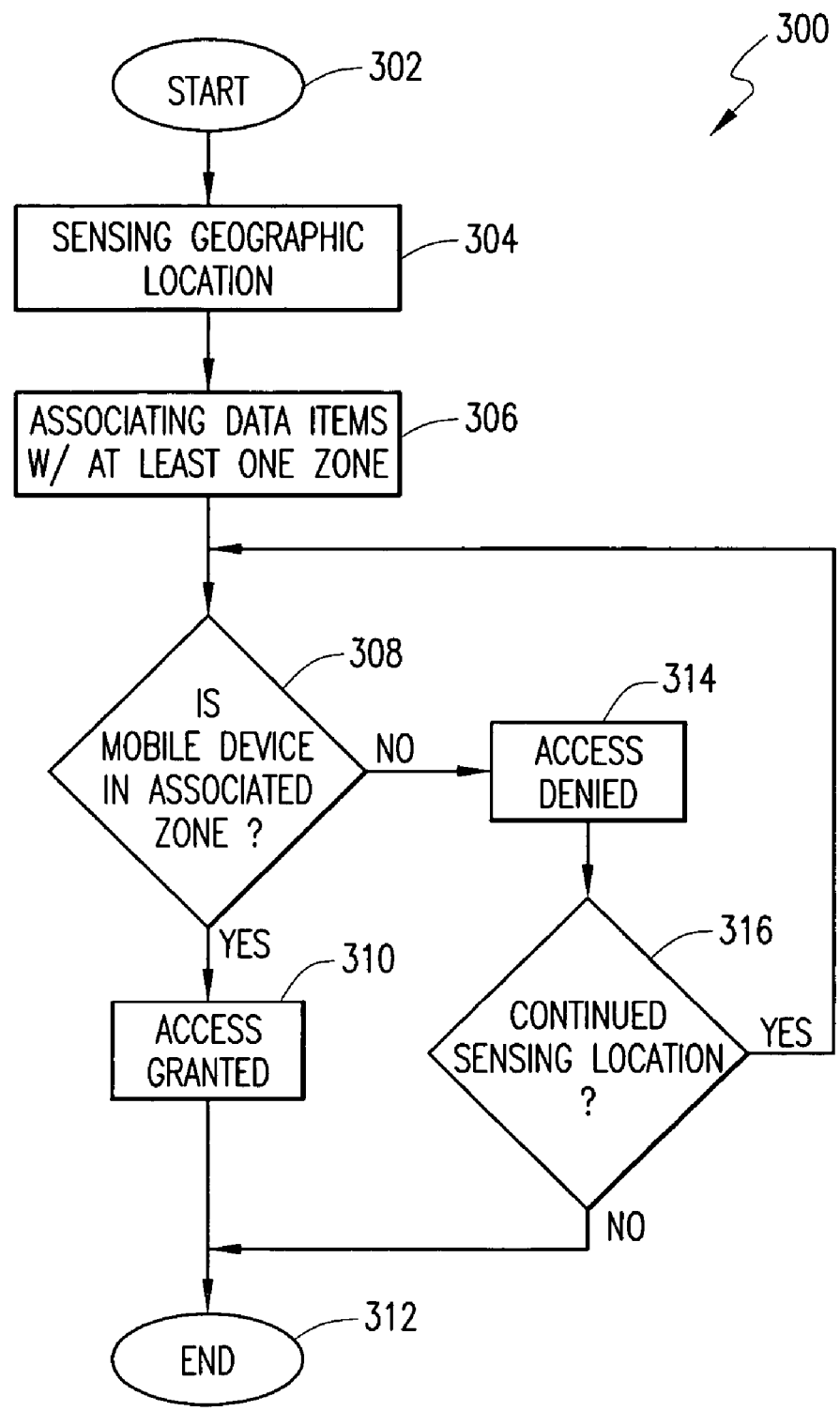
FIG. 3 is a flow diagram illustrating a method of operating a mobile device in accordance with an embodiment of the present invention.

Referring now to FIG. 3, a method 300 of operating a mobile device in accordance with an embodiment of the present invention is illustrated. The method 300 begins at 302 and senses a geographic location at step 304. At step 306, data items are associated with at least one zone. Steps 304 and 306 may be performed sequentially, or simultaneously and are interchangeable in order. As noted above, the data items may be associated with a particular zone directly, or each data item may be stored in a category that is associated with a particular zone or zones. At step 308, it is determined whether the mobile device is within a zone associated with a data item to which the user requests access. If the mobile device is within the associated zone, then access is granted at step 310 and the method ends at step 312. If the mobile device is not within the associated zone, then access is denied at step 314. The mobile device then determines either to continue or desist in sensing the location of the mobile device at step 316. If the sensing is to be discontinued, then the method ends at step 312. If the mobile device determines that sensing of the location should be continued, then the method continues at step 308.

Figure 4:
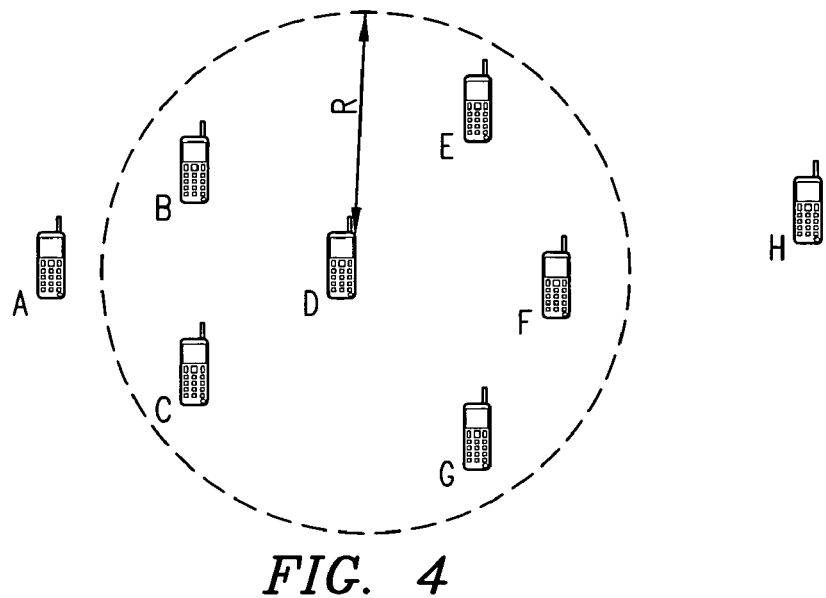
FIG. 4 is a diagram illustrating a personnel secure zone in accordance with an embodiment of the present invention.

Referring now to FIG. 4, a personnel secure zone is illustrated. In the personnel secure zone, mobile devices identify any other mobile devices located within a predefined area defined by a radius r. As shown in FIG. 4, a mobile device D registers that mobile devices B, C, E, F, and G are within the predefined area. A mobile device A and a mobile device H are outside the predefined area. A personnel secure zone may be utilized between a specific group of personnel so that a secure item shared, modified, etc. between the personnel group may not be accessed, modified, shared, etc. without a predetermined number or percentage of the personnel group being present or assenting to the access, sharing or modification. For example, a personnel group of the mobile devices A, B, C, and D may create a secure item, such as a contract, memo, document, etc. The mobile device D may wish to share or modify the secure item. For example, in order for the mobile device D to modify the secure item, a predetermined percentage, such as 75%, of the personnel group must be present. Because the mobile device D senses that 75% of the personnel group (i.e., the mobile devices B, C, and D) is present, the mobile device D may access and/or modify the secure item. In a similar manner, the mobile device D may wish to share the secure item with another mobile device outside of the personnel group, such as the mobile device F. Because 75% of the personnel group is present, the secure item may be shared with the mobile device F. Although the above example is illustrated utilizing the predetermined percentage of 75%, it will be understood by one skilled in the art that other percentages or forms of approval may be utilized for allowing access, etc. to the secure item. For example, a mobile device wishing to modify the secure item may get an approval signal from various ones of the mobile devices of the personnel group. In another option, the personnel group may assign their own parameters for allowing access to the secure item.

Figure 5:
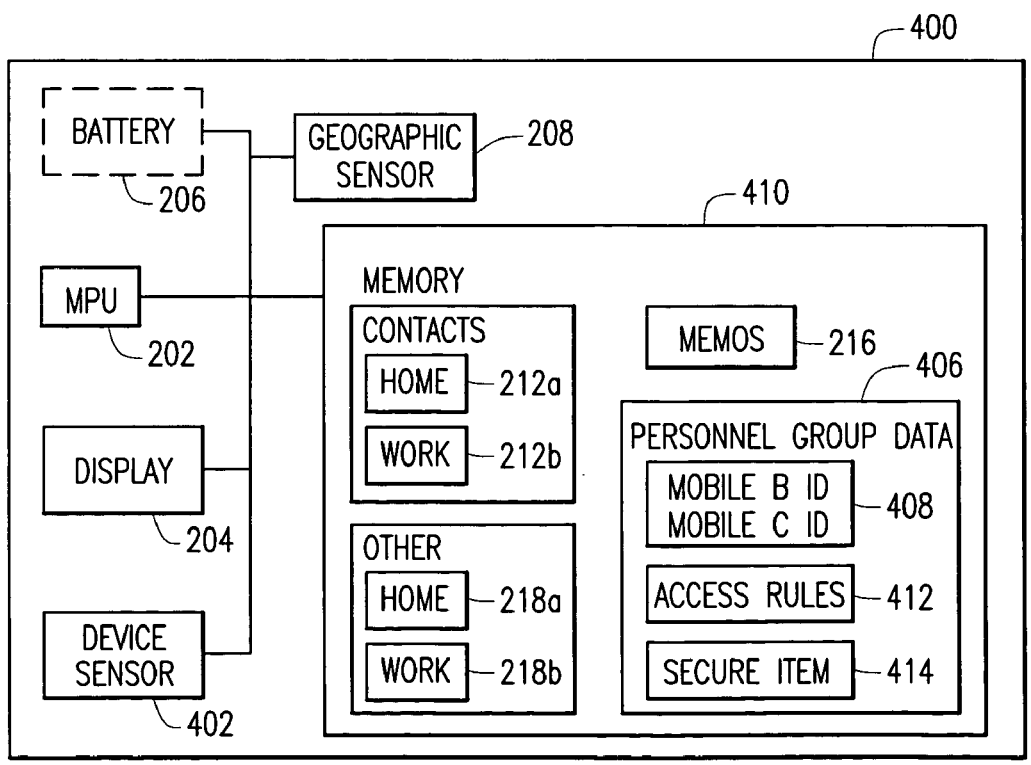
FIG. 5 is a block diagram of a mobile device in accordance with an alternate embodiment of the present invention.

Referring now to FIG. 5, a mobile device 400 in accordance with another embodiment of the present invention is illustrated. The mobile device 400 includes a microprocessor (MPU) 202, a display 204, and optional battery 206 in a manner similar to the mobile device 200 of FIG. 2. In the embodiment illustrated in FIG. 5, the mobile device 400 also includes a device sensor 402 for detecting other mobile devices 400 within a predefined area and a memory 410. The device sensor 402 may be implemented as, for example, an infrared sensor, BLUETOOTH sensor, or other sensor capable of determining if other mobile devices are present in a predefined area.

The geographic sensor 208, as described above with reference to FIG. 2, is optional in the mobile device 400. If the geographic sensor 208 is not present in the mobile device 400, the data items may be accessed according to the personnel secure zones. If the geographic sensor 208 is present in the mobile device 400, then the data items may be accessed according to the personnel secure zones, the geographic secure zones, or a combination of both geographic and personnel secure zones. For example, the, work contacts 212b may be accessed based on geographic secure zones and memos or other data items may be accessed according to the personnel secure zones. In addition, secure items that are work related may only be accessed in a geographic work zone (e.g., the zone 3) while a predetermined number of the personnel group is present in the personnel secure zone, although other arrangements of geographic secure zones and personnel secure zones may be utilized in accordance with embodiments of the present invention.

The memory 410 may be organized into categories 220 similar to that of FIG. 2, according to data item (as shown in FIG. 5), or according to other properties as desired. When utilizing personnel secure zones, the memory 410 may include a personnel group data category 406. The personnel group data category 406 may include identities 408 of mobile devices within the personnel group and rules 412 for allowing access to secure items 414. Secure items 414 are data items that are accessible according to the personnel secure zones.

As illustrated above, data items or secure items may be accessed only when specific conditions are met (e.g., the mobile device 200, 400 is within a specific geographic zone or a number of mobile devices 200, 400 of the personnel group are present). The inability to access information when these conditions are not met may be provided by various techniques. For example, the secure items or data items may be "locked" to prevent access to a memory location storing the item. In another option, the items may be encrypted and decryption enabled only when the conditions are met to allow access to the items. Other techniques may also be utilized to prevent access to data in accordance with principles of the present invention.

Embodiments of the present invention may be utilized to organize data items. For example, the geographic secure zones may be utilized to present data items in a specific order related to location. In one aspect, when the mobile device 200, 400 determines that the mobile device 200, 400 is in a work zone, then information, e.g., in the contacts data item, may be arranged so that work contacts appear at the upper portion of a contacts listing. When the mobile device 200, 400 enters a home zone, the information in the contacts data item may be rearranged to present personal contacts at the upper portion of the contacts listing. Similarly, personnel secure zones may be utilized to organize data items according to personnel. For example, when the mobile device 200, 400 senses another mobile device 200, 400 that is associate with a specific zone, e.g., a work zone, then information related to the sensed mobile device 200, 400 or work information is organized to be viewed first by the mobile device 200, 400.

Figure 6:
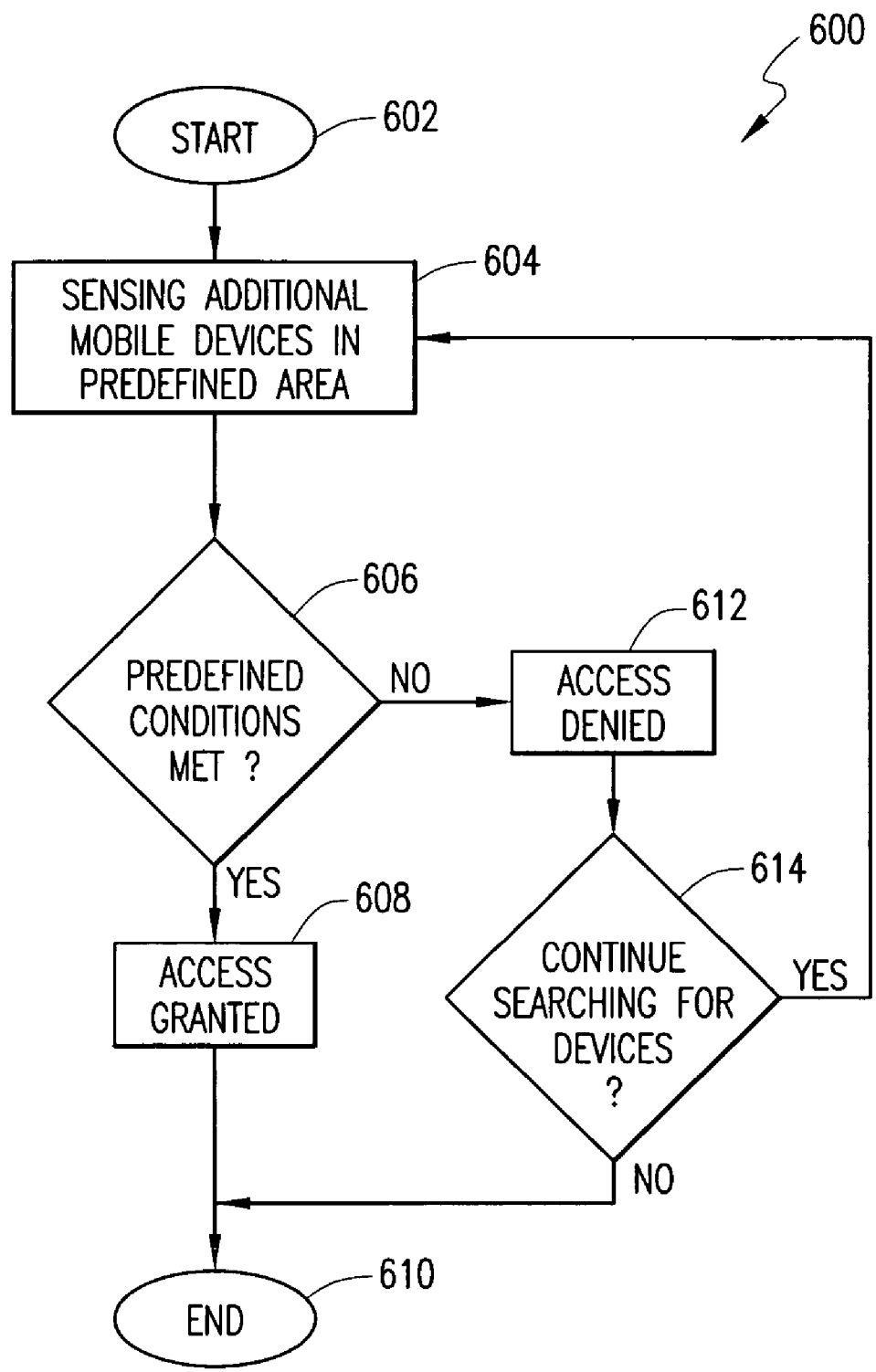
FIG. 6 is a flow diagram illustrating a method of operating a mobile device in accordance with an alternate embodiment of the present invention.

Referring now to FIG. 6, a method 600 of operating a mobile device in accordance with another embodiment of the present invention is illustrated. The method 600 begins at step 602 and proceeds to sense for additional mobile devices within a predefined area at step 604. At step 606, it is determined whether predefined conditions regarding the particular data item to which a user requests access have been met. If the predefined conditions are met, then, at step 608 access is granted and the method ends at step 610. If the predefined conditions are not met, then, at step 612 access is denied. At step 614, the mobile device determines whether searching for other mobile devices should be continued. If searching is not continued, then the methods ends at step 610. If the searching for other mobile devices is continued, then the method returns to step 604.

It is thus believed that the operation and construction of various embodiments of the present invention will be apparent from the foregoing Detailed Description. While various devices have been described, it will be obvious to a person of ordinary skill in the art that various changes and modifications may be made therein without departing from the spirit and scope of the invention, as defined in the following claims. Therefore, the spirit and the scope of the appended claims should not be limited to the description of the embodiments contained herein.

What is claimed is:

1. A mobile device adapted to be responsive to at least one geographic zone, the mobile device comprising:
    a geographic sensor for determining an approximate location of the mobile device;
    a memory for storing information, wherein at least a portion of the information is associated with the at least one geographic zone;
    a display for presenting the information to the user; and
    a microprocessor, interoperably coupled to the memory and the display, for controlling the mobile device and being adapted for receiving data from the geographic sensor and determining whether the mobile device is located in a particular one of the at least one geographic zone,
    wherein the memory is adapted to store the information in the form of a plurality of data items,
    wherein each of the plurality of data items is associated with at least one particular geographic zone of a plurality of geographic zones, and
    each of the plurality of data items is accessible in dependence of whether it is determined by the microprocessor that the mobile device is located in an associated particular geographic zone and
    the microprocessor presents the plurality of data items to the user on the display in an order that is a function of the particular one of the at least one geographic zone,
    wherein the data items associated with the at least one geographic zone in which the mobile device is located is presented to the user in priority before other data items are presented to the user.

2. The mobile device of claim 1, wherein if the microprocessor determines that the mobile device is located in a particular secure zone, information stored in the memory may be accessed.

3. The mobile device of claim 1, wherein if the microprocessor determines that the mobile device is not located in a particular secure zone, information stored in the memory is not accessible.

4. The mobile device of claim 3, wherein the inaccessible information is not decryptable.

5. The mobile device of claim 3, wherein the inaccessible information is locked.

6. The mobile device of claim 1, wherein the memory stores personal information in a home category portion of the memory.

7. The mobile device of claim 6, wherein the home category portion of the memory is accessible when the mobile device is located in a home zone.

8. The mobile device of claim 1, wherein the memory stores work information in a work category portion of the memory.

9. The mobile device of claim 8, wherein the work category portion of the memory is accessible when the mobile device is located in a work zone.

10. The mobile device of claim 1, wherein each data item stored in the memory is associated with at least one of the at least one geographic zone in which the data item is accessible.

11. The mobile device of claim 1, wherein each data item stored in the memory is associated with at least one of the at least one geographic zone in which the data item is not accessible.

12. The mobile device of claim 1, further comprising a device sensor for sensing at least one additional mobile device within a predefined area.

13. A method of utilizing at least one geographic zone in the operation of a mobile device, the method comprising the steps of:
    determining, by a geographic sensor, an approximate location of the mobile device;
    storing information in a memory in a plurality of data items,
    wherein a plurality of the data items are associated with at least one geographic zone of a plurality of geographic zones;

determining whether the mobile device is located in a particular one of the at least one geographic zone based on data received from the geographic sensor, and accessing the plurality of data items in dependence of whether it is determined by the microprocessor that the mobile device is located in an associated particular geographic zone associate with the data items and presenting the sorted data items to the user in an order that is a function of the particular one of the at least one geographic zone, and the data items are presented to the user on a display of the mobile device, wherein data items associated with the at least one geographic zone in which the mobile device is located is presented to the user on the display in priority before other information is presented to the user.

14. The method of claim 13, further comprising the step of allowing access to the information if the mobile device is located in a particular one of the at least one geographic zone.

15. The method of claim 13, further comprising the step of preventing access to the information if the mobile device is not located in a particular one of the at least one geographic zone.

16. The method of claim 15, wherein the step of preventing comprises the step of locking the information.

17. The method of claim 15, wherein the step of preventing comprises the step of preventing decryption of the information.

18. The method of claim 13, further comprising the step of storing personal information in a home category portion of the memory.

19. The method of claim 18, further comprising the step of allowing access to the home category portion of the memory when the mobile device is located in a home zone.

20. The method of claim 13, further comprising the step of storing work information in a work category portion of the memory.

21. The method of claim 20, further comprising the step of allowing access to the work category portion of the memory when the mobile device is located in a work zone.

22. The method of claim 13, further comprising the step of associating each data item stored in the memory with at least one of the at least one geographic zone in which the data item is accessible.

23. The method of claim 13, further comprising associating each data item stored in the memory with at least one of the at least one geographic zone in which the data item is not accessible.

* * * * *